No. 771,734. PATENTED OCT. 4, 1904.
J. W. KEPHART.
SHINGLE SAWING MACHINE.
APPLICATION FILED AUG. 28, 1902.
NO MODEL.
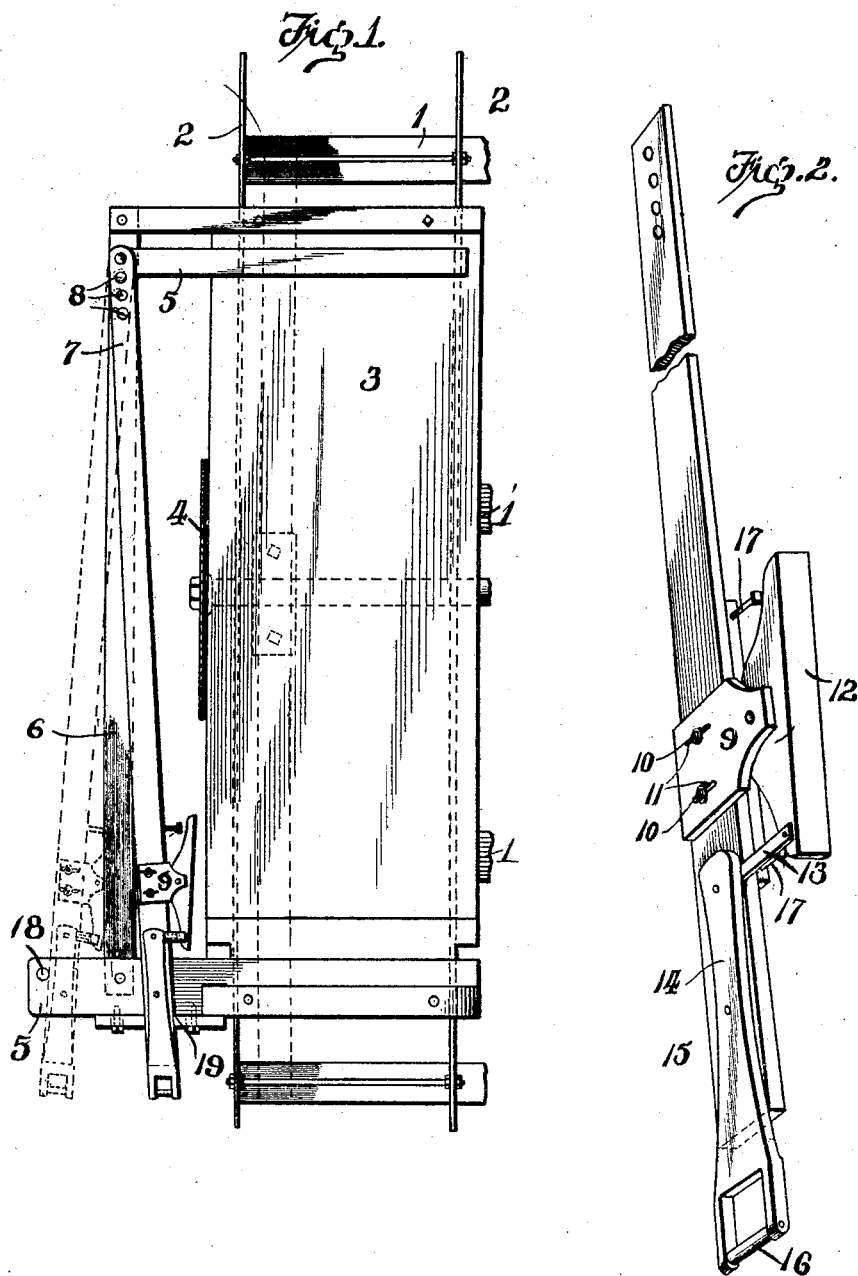
Witnesses
A B Williams
Edgar M Kitchin
Inventor
John W Kephart
By Mason Fenwick Lawrence
his Attorneys No. 771,734.

Patented October 4, 1904.

UNITED STATES PATENT OFFICE.

JOHN W. KEPHART, OF HERNDON, VIRGINIA.

SHINGLE-SAWING MACHINE.

SPECIFICATION forming part of Letters Patent No. 771,734, dated October 4, 1904.

Application filed August 28, 1902. Serial No. 121,367. (No model.)

*To all whom it may concern:*

Be it known that I, JOHN W. KEPHART, a citizen of the United States, residing at Herndon, in the county of Fairfax and State of Virginia, have invented certain new and useful Improvements in Shingle-Sawing Machines; and I do hereby declare the following to be a full, clear, and exact description of the invention, such as will enable others skilled in the art to which it appertains to make and use the same.

The present invention relates to shingle-sawing machines, and particularly to that type provided with means for shifting the block being sawed alternately to opposite angles relative to the saw for cutting beveled shingles and at the same time retaining the block in an approximately rectangular condition.

The object in view is the provision of guiding means for a shingle-sawing machine which is capable of shifting to opposite angles relative to the saw whereby a block being sawed may be likewise shifted when held in contact with such guide.

With this and other objects in view the invention consists, in combination with any suitable framework carrying a saw, a table moving in the framework, of a main lever pivoted to the table, a guide pivoted to said lever, and an auxiliary lever pivoted to the main lever and pivotally connected with said guide.

It also consists in certain other novel constructions, combinations, and arrangements of parts, as will be hereinafter fully described and claimed.

In the accompanying drawings, Figure 1 represents a top plan view of a shingle-sawing machine embodying the features of the present invention, parts of the supporting structure being broken away. Fig. 2 represents an enlarged detail perspective view of the main lever and parts carried thereby.

In the sawing of shingles it has been found necessary to shift the block from which the shingles are being cut to first one angle relative to the saw and holding it there until a shingle has been cut and then shifting the block to the opposite angle, where it is retained until another shingle is cut, as this is the most convenient way of producing shingles and at the same time exercising economy in the utilization of material by retaining the block from which the shingles are being cut in an approximately rectangular condition, whereby practically no waste is occasioned, owing to the fact that there is no "corner" left after the block has been sawed. In order to accomplish this shifting of the block and still present the same to the saw in such manner as to produce precisely the same-sized shingle at each operation, I employ the structure disclosed in the accompanying drawings, in which—

1 indicates any preferred form of support provided with any desired form of tracks 2, carrying a longitudanally-movable table 3, and suitable saw 4, positioned contiguous the edge of said table. Extending past the longitudinal vertical plane of the saw are suitable transverse beams 5 5, connected by a longitudinal beam 6, spaced a suitable distance from the saw 4. Thus far the matter described is well known in the art and does not embody features of the present invention, although necessary for carrying out the same.

Pivoted to one of the rear beams 5 is a main operating-lever 7, formed with a series of apertures 8 for permitting longitudinal adjustment thereof. Near the front end of the lever 7 is positioned a transversely-adjustable block 9, attached to said lever by means of suitable bolts 10 10, passed through adjusting-slots 11. Pivoted to the laterally-projecting end of the block 9 and lying in the same horizontal plane with lever 7 is a suitable guide 12, which is pivotally connected by a link 13 to the rear end of an auxiliary lever 14, which lever in turn is pivoted, as at 15, to the main lever 7, the front end of said auxiliary lever being provided with an operating-handle of any preferred type, as at 16. The main lever 7 carries an adjustable stop 17 near each end of guide 12, each of said stops preferably consisting of a screw threaded into the lever or into a suitable block carried thereby, whereby adjustment of said stops will control the angle of adjustment of the guide 12.

The foremost beam 5 is preferably provided with limiting-stops 18 and 19 of any preferred type for governing the length of the throw of the lever 7.

In operation a block of wood from which the shingle is to be sawed is placed with its flat face against the face of guide 12, the main lever 7 and auxiliary lever 14 being in the position indicated in full lines in Fig. 1. The table 3 is now moved longitudinally, and the saw 4 passes through the block, cutting the shingle of beveled form. As soon as the shingle has been cut the main lever 7 is moved laterally by the operator, who at all times retains the handle 16 within his grasp. This lateral movement releases the cut shingle and permits the same to drop. The lever may be moved laterally until it comes into contact with stop 18; but it is usually not necessary to swing the same to this extent. The table 3 and the lever 7 are next brought to their initial position with the block in contact with guide 12. The operator now moves the auxiliary lever 14 laterally independently of lever 7, whereby through the link connection 13 the guide 12 is shifted to an opposite angle with respect to the saw 4 to that previously maintained, the said guide contacting with the opposite stop 17 to that with which it was formerly in contact. The table is then moved rearwardly and the sawing operation completed, as before.

Although I have specifically set forth the details of one particular embodiment of the present device, yet I desire it to be decidedly understood that I do not limit myself to the minor details of structure, but shall feel myself at liberty at all times to deviate therefrom, particularly with reference to size, shape, and minor features to any degree within the scope of the present invention.

Having thus fully described my invention, what I claim as new, and desire to secure by Letters Patent, is—

1. In a mechanism of the class described, the combination with a support, a saw carried thereby, and a table moving contiguous to said saw, of a main lever pivoted to said table and extending past said saw, a guide pivotally carried by said lever, an auxiliary lever pivoted to said main lever, and connections between said auxiliary lever and guide for facilitating movement of the guide by movement of said auxiliary lever.

2. In a mechanism of the class described, the combination with a support, a saw carried thereby and a table moving contiguous to said saw, of a main lever pivoted to said table, a guide carried by said lever, an auxiliary lever also carried by said main lever, and a link connecting said auxiliary lever with said guide, whereby the guide is adapted to be shifted to various angles with respect to said saw by movement of said auxiliary lever.

3. In a mechanism of the class described, the combination with a support, a saw carried thereby, and a table moving contiguous to said saw, of a main lever pivoted to said table, a guide arranged longitudinally of said lever and pivotally carried thereby, an auxiliary lever pivotally carried by said main lever, and a link connecting the rear end of said auxiliary lever with the front end of said guide.

4. In a mechanism of the class described, the combination with a support, a saw carried thereby, and a table moving contiguous to said saw, of a main lever pivoted to said table extending past said saw and adapted to be swung upon its pivot toward and away from the saw, a guide pivotally carried by said lever, an auxiliary lever extending parallel to the longitudinal axis of said main lever and pivoted thereto intermediate the length of the auxiliary lever, and connections between said auxiliary lever and guide for facilitating movement of the guide by movement of said auxiliary lever.

In testimony whereof I hereunto affix my signature in presence of two witnesses.

JOHN W. KEPHART.

Witnesses:
 JOHN L. FLETCHER,
 EDGAR M. KITCHIN.